United States Patent [19]
Casey et al.

[11] Patent Number: 6,009,794
[45] Date of Patent: Jan. 4, 2000

[54] COOKING MEDIUM MANAGEMENT SYSTEM

[75] Inventors: William M. Casey, Dayton; Richard L. Jones, Eaton; Robert W. Stirling, Dayton; David B. Winter, Eaton, all of Ohio

[73] Assignee: Henny Penny Corporation, Eaton, Ohio

[21] Appl. No.: 09/306,423

[22] Filed: May 6, 1999

Related U.S. Application Data

[62] Division of application No. 08/995,166, Dec. 19, 1997.

[51] Int. Cl.$^7$ .............................. A47J 27/62; A47J 37/12
[52] U.S. Cl. ................................ 99/330; 99/331; 99/403; 219/492; 219/506; 364/400; 364/557
[58] Field of Search .............................. 99/325, 330–336, 99/337, 338, 403–410, 411–418; 219/448, 492, 483, 501, 486, 494, 506; 364/400, 557, 143–146; 426/233, 438, 523; 126/391, 300, 299 D

[56] References Cited

U.S. PATENT DOCUMENTS

| | | |
|---|---|---|
| 2,840,436 | 6/1958 | Mason . |
| 3,701,313 | 10/1972 | Boggs . |
| 3,958,503 | 5/1976 | Moore . |
| 4,179,214 | 12/1979 | Pone, Jr. ..................................... 99/330 |
| 4,282,423 | 8/1981 | Volz . |
| 4,447,692 | 5/1984 | Mierzwinski . |
| 4,636,949 | 1/1987 | Longabaugh . |
| 4,812,625 | 3/1989 | Ceste, Sr. ................. 219/492 |
| 4,858,119 | 8/1989 | Waugh et al. . |
| 4,913,038 | 4/1990 | Burkett et al. . |
| 4,920,948 | 5/1990 | Guerin et al. ............................. 99/330 |
| 5,033,368 | 7/1991 | Brewer . |
| 5,060,559 | 10/1991 | Winter . |
| 5,073,861 | 12/1991 | Itoh et al. ............................ 364/400 X |
| 5,090,305 | 2/1992 | Lehman . |
| 5,097,113 | 3/1992 | Aoyama . |
| 5,101,714 | 4/1992 | Grandi ...................................... 99/335 |
| 5,126,536 | 6/1992 | Devlin .................................. 99/333 X |
| 5,179,891 | 1/1993 | Chiu . |

(List continued on next page.)

*Primary Examiner*—Timothy Simone
*Attorney, Agent, or Firm*—Baker & Botts LLP

[57] ABSTRACT

A cooking medium management system and method from manipulating a cooking medium during cooking operations. The system has a controller generating a lock-out signal and a transfer signal, and selectively generating one control signal selected from the group consisting of a discard signal, a fresh fill signal, a drain signal, a filtration signal, and a polish signal. The system also has a cooking medium transfer pump and a transfer conduit for transferring the cooking medium to and from a frypot, wherein the transfer pump activates in response to the transfer signal. The system further includes a lock-out device, which receives the lock-out signal and disables a fryer heater. Moreover, this system includes a discard device, which receives the discard signal and includes the frypot, the drain pan, a drain valve and a cooking medium drain. The frypot and the drain pan are placed in communication with the transfer conduit via the drain valve. Subsequently, the drain pan and the cooking medium drain are placed in communication with the transfer conduit to discard used cooking medium. In addition, the system includes a fresh fill device, which receives the fresh fill signal and includes the frypot and a cooking medium source. The frypot and the cooking medium source are placed in communication with the transfer conduit to fill the frypot with fresh shortening. The system also includes a filtration device, which receives the filtration signal and places the frypot and drain pan in communication with the transfer conduit to filter the cooking medium. Finally, the system includes a polish device, which receives the polish signal and places the frypot and the drain pan in communication with the transfer conduit in response to the polish signal, fills the frypot to a predetermined level, and places the frypot and the drain pan in communication with the transfer conduit for a predetermined time period, and places the frypot and the drain pan out of communication with the transfer conduit after completion of the predetermined time period.

29 Claims, 10 Drawing Sheets

U.S. PATENT DOCUMENTS

| | | |
|---|---|---|
| 5,232,151 | 8/1993 | Mercer et al. . |
| 5,307,736 | 5/1994 | Sorensen ................................ 99/407 X |
| 5,313,876 | 5/1994 | Hilger et al. . |
| 5,331,575 | 7/1994 | Koether et al. . |
| 5,352,866 | 10/1994 | Cartwright et al. . |
| 5,398,597 | 3/1995 | Jones et al. . |
| 5,398,668 | 3/1995 | Daneshvar et al. ..................... 126/391 |
| 5,454,296 | 10/1995 | Beardsley et al. ........................ 99/403 |
| 5,490,449 | 2/1996 | Meister et al. . |
| 5,528,018 | 6/1996 | Burkett et al. . |
| 5,534,708 | 7/1996 | Ellinger et al. . |
| 5,605,091 | 2/1997 | Garber ..................................... 99/330 |
| 5,617,776 | 4/1997 | King et al. . |
| 5,617,777 | 4/1997 | Davis et al. . |
| 5,695,671 | 12/1997 | Landwehr et al. . |
| 5,776,530 | 7/1998 | Davis et al. ............................ 426/233 |
| 5,901,640 | 5/1999 | Castlebury ............................... 99/330 |

COOKING MEDIUM MANAGEMENT SYSTEM

This application is a divisional of application Ser. No. 08/995,166, filed Dec. 19, 1997, pending entitled COOKING MEDIUM MANAGEMENT SYSTEM AND METHOD FOR MANIPULATING COOKING MEDIUM DURING COOKING OPERATIONS.

BACKGROUND OF THE INVENTION

1. Field of the Invention

This invention relates to deep fat fryers generally, and more particularly, to a cooking medium management system which manipulates a cooking medium and method for managing a cooking medium during cooking operations.

2. Description of the Related Art

Large capacity, pressurized, deep fat fryers are known in the art and have been devised for cooking products in a heated or pressurized environment, or both. Typically, such devices may include a cooking vessel, referred to as a frypot, which may be filled with a cooking medium, such as oil, shortening, water, or the like, and heating devices surrounding or immersed in the vessel, or both, for heating the cooking medium. Products to be cooked are placed in the cooking vessel, either directly or in a container, such as a basket, and are cooked for a desired length of time.

These fryers may have a temperature probe, a heating element, a level indicator, a drain pan, and a temperature selector enabling an operator to select a desired cooking temperature. Moreover, the fryers may have a transfer means for introducing the cooking medium into the cooking device and removing used cooking medium from the cooking device when needed. This transfer means may also transfer the cooking medium from the cooking vessel to the drain pan and vice versa. Control means controls the heating device(s) in different modes of operation corresponding to the different stages of preparing food products. Further, the control means controls transfers means in accordance with the type of operation to be performed. For example, the transfer means may transfer the cooking medium from the frypot to the drain pan to be filtered.

These fryers also provide for proper maintenance of the cooking medium. Specifically, if shortening is used, it is necessary to filter the shortening periodically to maintain cooking quality due to the absorption of oils and odor associated with the cooked food products, and degradation of the shortening caused by breakdown due to heat, extended use, and other factors. Thus, the cooking medium is drained periodically in order to be filtered.

These fryers also must be primed after periods of non-use. Usually, stratified shortening left over from a previous use is blended in a "polishing" procedure. By polishing, a cooking device may produce a quality tasting food product, even with the first few batches.

Currently, these different operations are handled manually by operators. In other systems, the host processor is responsible for directing operations within the system. Host processor failure or operator error prevents shortening management on all the fryers controlled by these systems. In addition, operator intervention is required at every level of the different operations, which increases operating costs and may adversely affect personnel safety.

SUMMARY OF THE INVENTION

A system for manipulating a cooking medium during cooking operations is disclosed. The system comprises a controller generating a lock-out signal and a transfer signal and selectively generating at least one control signal selected from the group consisting of a discard signal, a fresh fill signal, a filtration signal, a polish signal, and combinations thereof. The system further comprises a cooking medium transfer pump and a transfer conduit for transferring the cooking medium to and from at least one frypot and to and from at least one drain pan, wherein the transfer pump activates in response to the transfer signal. The system also comprises a lock-out device, a fresh fill device, a discard device, a filtration device, and a polish device. The lock-out device receives the lock-out and disables at least one fry heater. The discard device receives the discard signal and includes the at least one frypot, the at least one drain pan, a drain valve and a cooking medium drain, wherein the at least one frypot and the at least one drain pan are placed in communication with the transfer conduit via the drain valve, and subsequently, the drain pan and the cooking medium drain are placed in communication with the transfer conduit in response to the discard signal. The fresh fill device receives the fresh fill signal and includes the at least one frypot and a cooking medium source, wherein the at least one frypot and the cooking medium source are placed in communication with the transfer conduit in response to the fresh fill signal. The filtration device receives the filtration signal and includes the at least one drain pan, wherein the drain pan is placed in communication with the transfer conduit in response to the filtration signal. The polish device receives the polish signal and places the frypot and the drain pan in communication with the transfer conduit in response to the polish signal, fills the frypot to a predetermined level, and places the at least one frypot and the at least one drain pan in communication with the transfer conduit for a predetermined time period, and places the at least one frypot and the at least one drain pan out of communication with the transfer conduit after completion of the predetermined time period.

In another embodiment, a method for managing a cooking medium management system which manipulates a cooking medium during cooking operations is disclosed. The method comprises generating a lock-out signal to disable at least one fryer heater and a transfer signal to activate a cooking medium pump. The cooking medium pump is in fluid communication with at least one frypot and at least one drain pan via a transfer conduit, which transfers the cooking medium to and from the frypot and to and from the drain pan. The method further comprises the step of generating at least one control signal selected from the group consisting of a discard signal, a fresh fill signal, a filtration signal, and a polish signal and combinations thereof. The method further comprises the step of the frypot and the drain pan in communication with the transfer conduit via drain valve, and subsequently placing the at least one drain pan and a cooking medium drain in communication with the transfer conduit in response to the discard signal. The method further comprises the step of placing the frypot and a cooking medium source in communication with the transfer conduit in response to the fresh fill signal. The method further comprises the step of placing the drain pan in communication with the transfer conduit in response to the filtration signal. The method further comprises the step of placing the frypot and the drain pan in communication with the transfer conduit, and filling the frypot to a predetermined level, and placing the frypot and the at least one drain pan in communication with the transfer conduit for a predetermined time period, and placing the frypot and the drain pan out of communication with the transfer conduit after completion of the predetermined time period in response to the polish signal.

An object of the present invention is to provide a system that manages tasks such as discard, fresh fill, drain, refill, filtration or polishing with minimal operator interface.

It is a feature of this invention to have a controller that generates a discard signal, a fresh fill signal, a drain signal, a refill signal, a filtration signal, or a polish signal to perform these tasks. It is an advantage of this invention that time and costs are reduced or minimized by having one controller that performs all these tasks without the need for operator intervention.

It is another object of this invention to decentralize operations performed on cooking devices. It is a feature of this invention to have a controller in the cooking device that performs these tasks without a host processor. It is an advantage of this invention that system availability is increased or maximized because the controllers are independent of other cooking devices. It is another advantage of this invention that cooking devices may be removed or shut down without impacting other cooking devices.

It is another object of this invention to perform polishing operations prior to cooking operations. It is a feature of this invention to have a polishing device, which polishes by cycling the cooking medium within the cooking device for a predetermined amount of time. It is an advantage of this invention that the shortening prepared for a better tasting food product resulting from cooking operations.

Other objects, features, and advantages will be understood in view of the following description of the preferred environments with respect to the drawings.

BRIEF DESCRIPTION OF THE DRAWINGS

For a more complete understanding of the present invention and the objects, features, and advantages thereof, reference now is made to the following descriptions taken in connection with the accompanying drawings in which:

FIG. 1b depicts a rear view of the embodiment of a fryer system of FIG. 1a;

FIG. 1c depicts a perspective view of the embodiment of a fryer system of FIG. 1a;

DESCRIPTION OF THE DRAWINGS

Preferred embodiments of the present invention and their advantages may be better understood by referring to FIGS. 1 through 10. In these Figures, the same numerals are used for corresponding parts of the various drawings.

Figure 1:
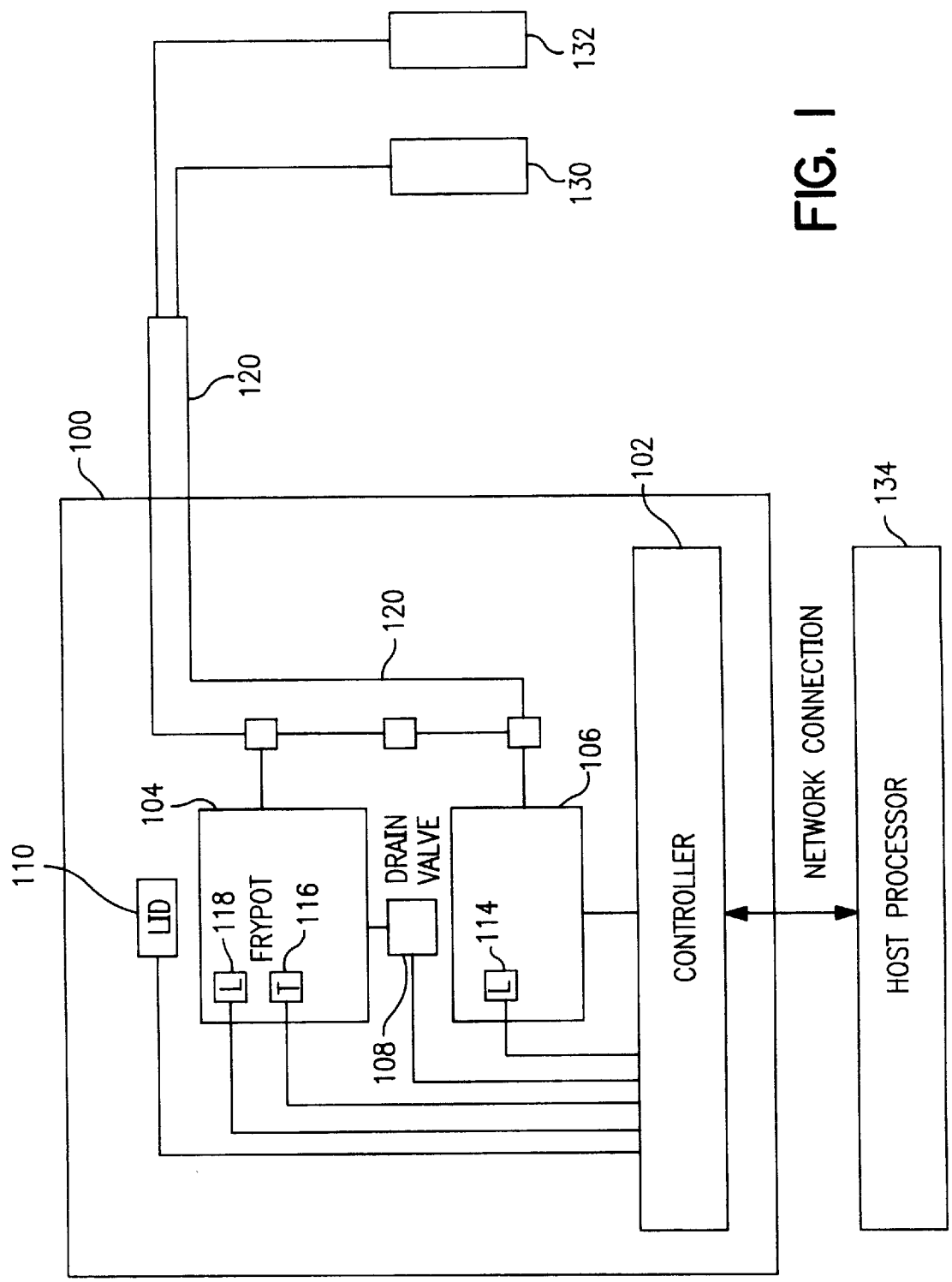
FIG. 1 is a schematic drawing of a system for manipulating a cooking medium during cooking operations in accordance with the present invention.

Referring to FIG. 1, a fryer system 100 is depicted. Fryer system 100 comprises a frypot 104, a drain pan 106, and a controller 102. Frypot 104 also includes a drain valve 108, a lid 110, cooking medium sensor 116, which is used to measure temperature, and level sensor 118, which is used to measure cooking medium level in frypot 104. Drain pan 106 may be a filter tank that includes a level sensor 114. Suitable level sensors 114 and 118 include an optical level sensor, mechanical float sensor, a pressure sensor an ultrasonic level sensor, a strain gauge sensor, a load cell and an optical flow sensor. In a preferred embodiment, level sensors 114 and 118 are optical level sensors. Also, there may be more than one level sensor 118 in frypot 104. A top fill line (not shown) and low fill line (not shown) may be used to indicate parameters for the amount of shortening allowable in frypot 104. Each of these locations may be indicated by a level sensor 118. If the amount of shortening is outside these parameters, fryer system 100 may not be available for cooking operations.

Figure 2:
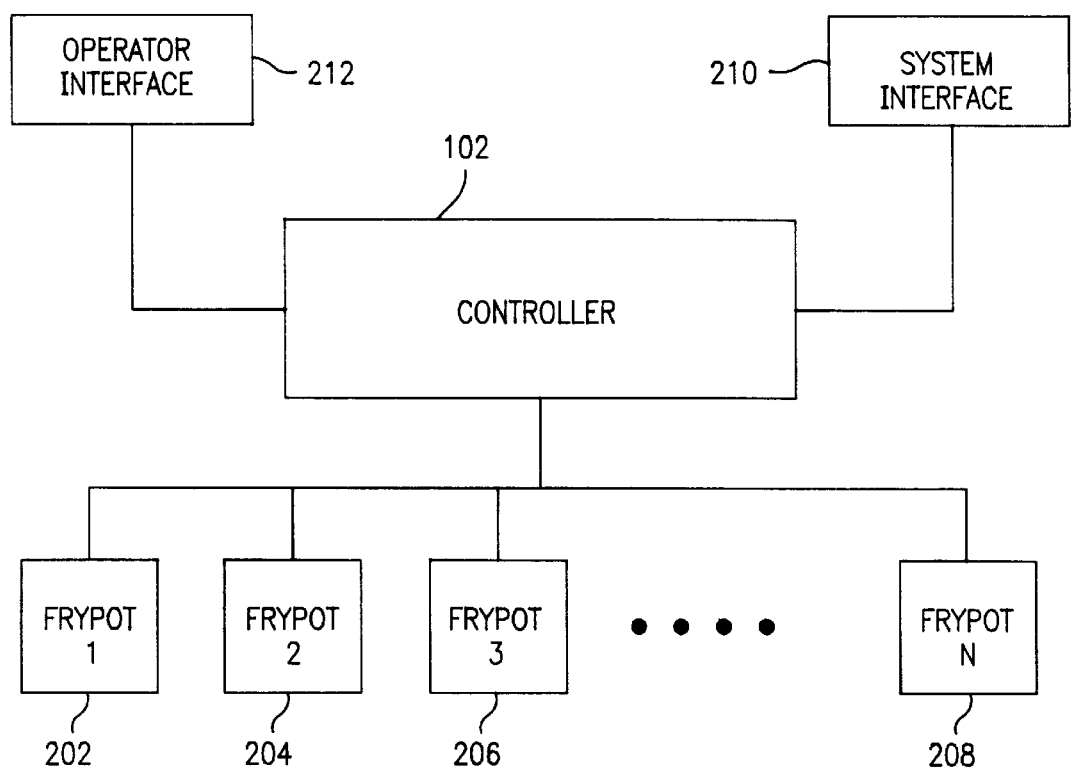
FIG. 2 is a schematic drawing of a second system for manipulating a cooking medium during cooking operations in accordance with the present invention.

Controller 102 may contain components for the control of all fryer electric valves in the drain and filter pump units. In a preferred embodiment, controller 102 may be a known individual process controller. The disclosed system may also be controlled by one central processor that interfaces with the individual process controllers and shown in FIG. 2. Referring to FIG. 2, controller 102 is connected to a plurality of fryer systems 202, 204, 206, and 208. Controller 102 uses an operator interface 212 and a system interface 210 to receive commands and to perform operations on the fryer systems in this embodiment.

Referring again to FIG. 1, a host processor 134 is connected to controller 102. Host processor 134 is not an integral part of the shortening management system, however, host processor 134 may include computer controls that signal controller 102. Moreover, host processor 134 may allow for manual override of controller 102. Connections between host processor 134 and controller 102 may be disconnectable, so that fryer system 100 may be removed for cleaning and/or service. End lines should be equipped with quick disconnects for easy removal.

Drain pan 106 may be located in any convenient location within fryer system 100. In a preferred embodiment, drain pan 106 is positioned to be accessible for removal and disposal of waste. Further, drain pan 106 may be equipped with a cover to prevent contamination of the shortening. Drain pan 106 may also be positioned at an elevation lower than fryer system 100 drain lines to promote gravity draining of frypots 104. In another embodiment, drain pan 106 may include a heater.

In addition, drain pan 106 may include a filtering unit consisting of a filter media, such as paper or cotton, supported by a screen or perforated plate assembly. The filtering unit may be sized as appropriate in order to provide the maximum surface area to reduce the frequency of changing filter media, due to the large volume of shortening filtered. It may also be desirable to incorporate a screen, sieve, or perforated strainer in drain pan 106 to catch crumbs and fine particles and prevent them from accumulating on the filter media. Drain pan 106 also may be equipped with a crumb catcher for proper disposal of the crumbs. The crumb catcher may be removed for cleaning.

Transfer conduit 120 may be used by fryer system 100 to transfer shortening from frypot 104 to drain pan 106 and vice versa. Transfer conduit 120 also may be used to introduce a fresh cooking medium to fryer system 100 or to discard cooking medium, as needed. Transfer conduit 120 may include systems that use pumps, valves, solenoids, load cells, and sensors in order to transfer the cooking medium from one element to another.

Figure 1A:
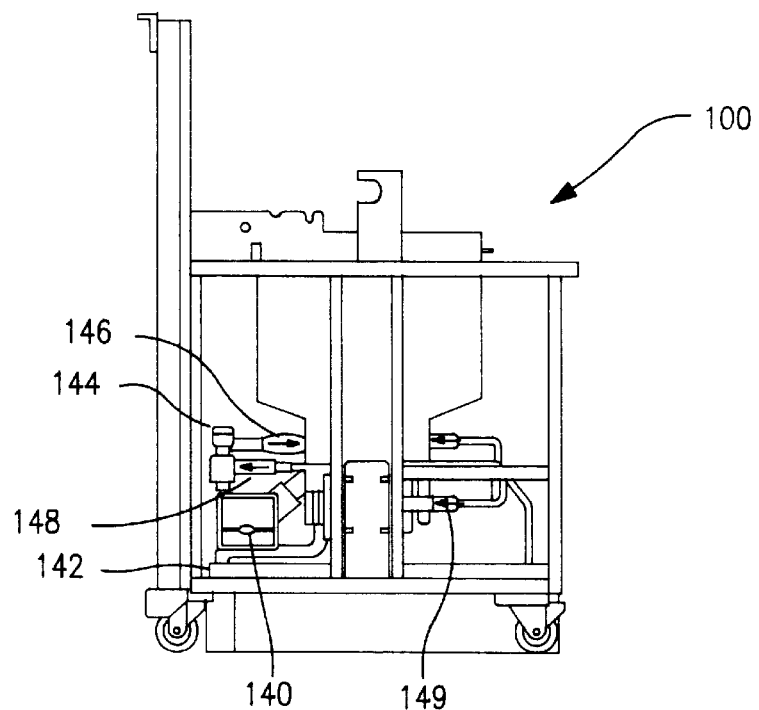
FIG. 1a depicts a side view of an embodiment of a fryer system for use in accordance with the present invention.

Referring to FIG. 1a, the preferred embodiment of fryer system 100 is depicted. A motorized drain valve 140 is used to drain shortening from frypot 104 to drain pan 106. Drain valve 140 may be electrically operated to open and close via commands from the controller 102. Drain valve 140, may be a globe-type valve or, alternatively, a ball-type valve, which includes a stainless steel ball. Load cell 142 is shown and indicates to the system when shortening is in the drain pan 106. Solenoid valve 144 is normally closed, but provides a means to insure that only transfer pipes of fryer system 100 are open when engaged. Transfer pipes transfer the shortening within fryer system 100. Solenoid valve 144 receives commands to open or close from the controller 102. When disengaged, solenoid valve 144 is closed and prevents shortening from entering or exiting fryer system 100 in error. Check valves 146, 148, 149 are used to keep air out of the transfer pipes and to keep the shortening flowing in one direction, as indicated on the individual transfer pipes.

Figure 1B:
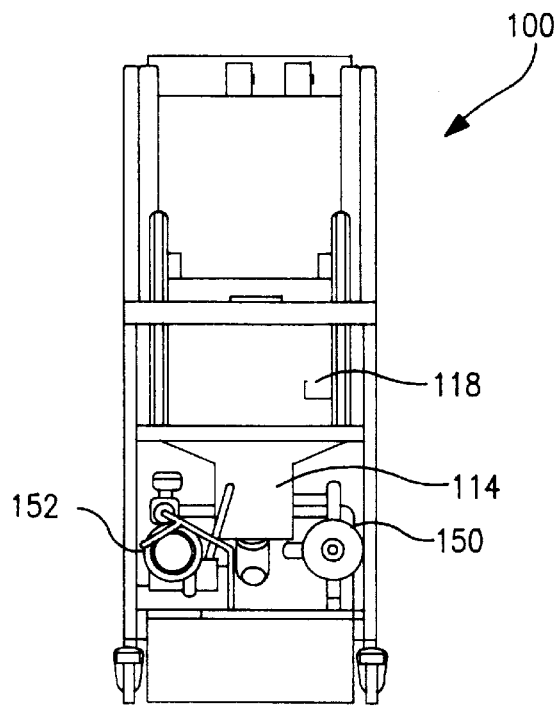
Figure 1C:
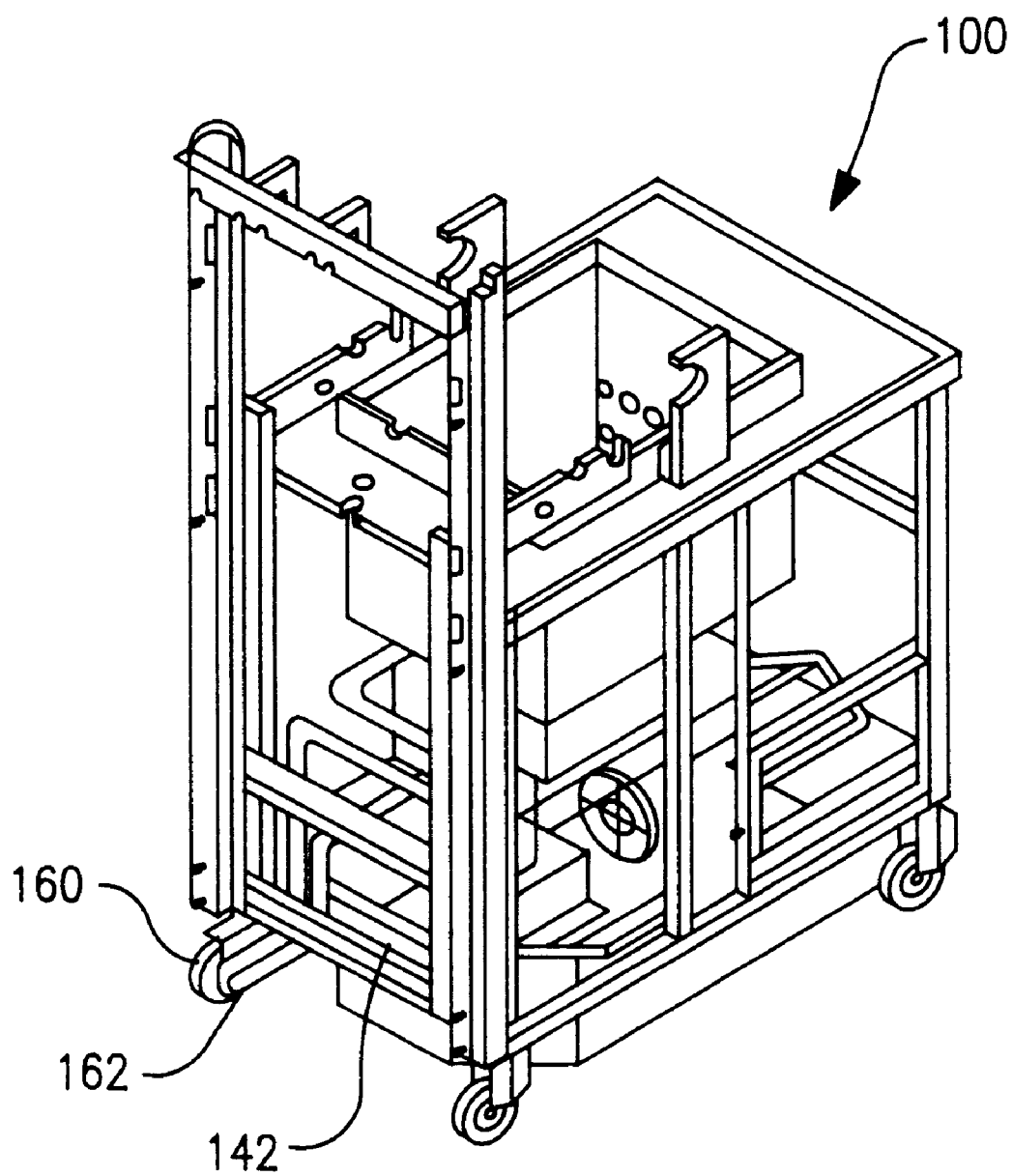

Referring to FIG. 1b, a rear view of fryer system 100 is depicted. In this view, rotary pump and motor 150 is indicated. Rotary pump and motor 150 is used to introduce fresh shortening into fryer system 100. Rotary pump and motor 152 is used to move shortening from drain pan 106 to frypot 104. An auxiliary pump (not shown) may be used to move shortening from drain pan 106 to a waste tank. These pumps are activated when shortening is to be moved within the fryer system 100. Sensors 118 are used to determine the level of frypot 104 while sensor 114 is used to determine the shortening level in drain pan 106. Referring to FIG. 1c, another view of fryer system 100 is depicted. Pipe 160 provides a supply connection to the transfer conduit 120 to introduce fresh shortening into the system. Pipe 162 is used to discard used shortening out of fryer system 100. Load cell 142 is also shown to indicate its location with reference to drain pan 106.

Referring again to FIG. 1, fryer system 100 also may be connected to a fresh storage tank 130 from which fresh cooking medium may be filled to the fryer system 100. Further, fryer system 100 may be connected to a waste storage tank 132 that would receive discarded shortening from drain pan 106. When the cooking medium in fryer system 100 is due for replacement, fryer system 100 is drained into the drain pan 106. The filter pump cycle may be bypassed, and the waste pump activated to pump the cooking medium into waste shortening tank 132. Fresh cooking medium is then delivered to fryer system 100 from fresh storage tank 130. Fresh storage tank 130 also may have a shut-off valve (not shown) at a discharge line (not shown) to gravity feed new cooking medium either directly into frypot 104 or into drain pan 106. Either storage tank may be mounted inside a wall of a structure in which cooking operations are performed, with fill provisions from outside. In another embodiment, such tanks may be located on the exterior of such structures, if climate conditions permit.

Figure 3:
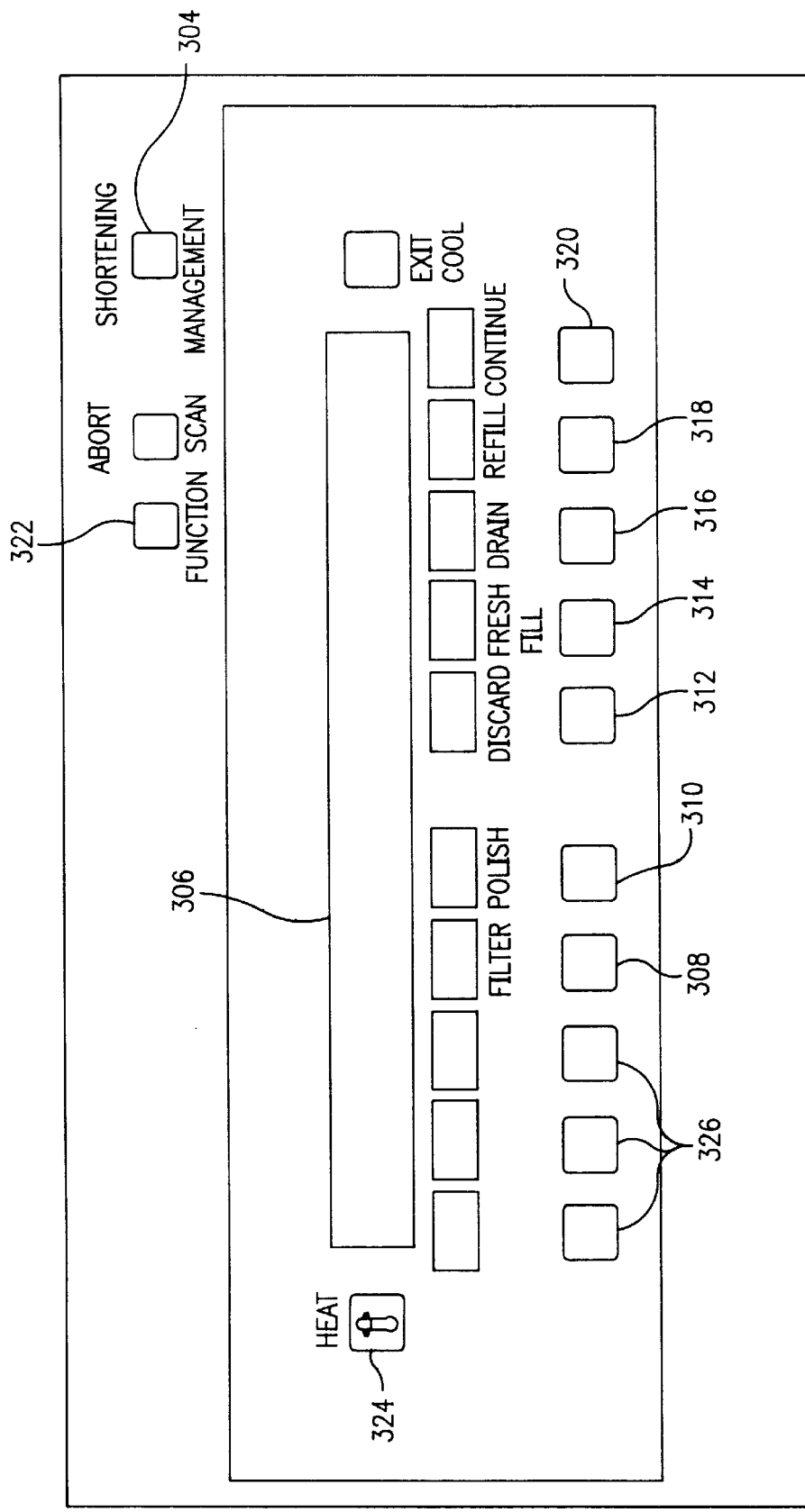
FIG. 3 illustrates a keypad for interfacing with the cooking medium management system in accordance with the present invention.

Referring to FIG. 3, a keypad 300 for use with the system is shown. Keypad 300 includes a display 306 where the current status of the shortening management system is displayed. Keypad 300 also has a heat indicator 324 that indicates when heat is being applied to the fryer system 100. Keypad 300 also includes function keys that are activated by the operator to determine what operation the shortening management system will perform. Key 304 is the shortening management system ("SMS") key that is activated by the operator to enter the shortening management system. Key 308 is the filter key; Key 310 is the polish key; Key 312 is the discard key; Key 314 is the fresh fill key; Key 316 is the drain key; Key 318 is the refill key; and Key 320 is the continue key. These keys, when activated, e.g., depressed, cause the correlating operation to be performed for the shortening management system. Keys may be activated for one second in order to execute the desired function. Abort key 322 is activated to abort shortening management system operations and to place fryer system 100 in a "safe" position. In the "safe" position, the valves, motors and pump of system 100 are deactivated and further cooking operations may be suspended.

Figure 4:
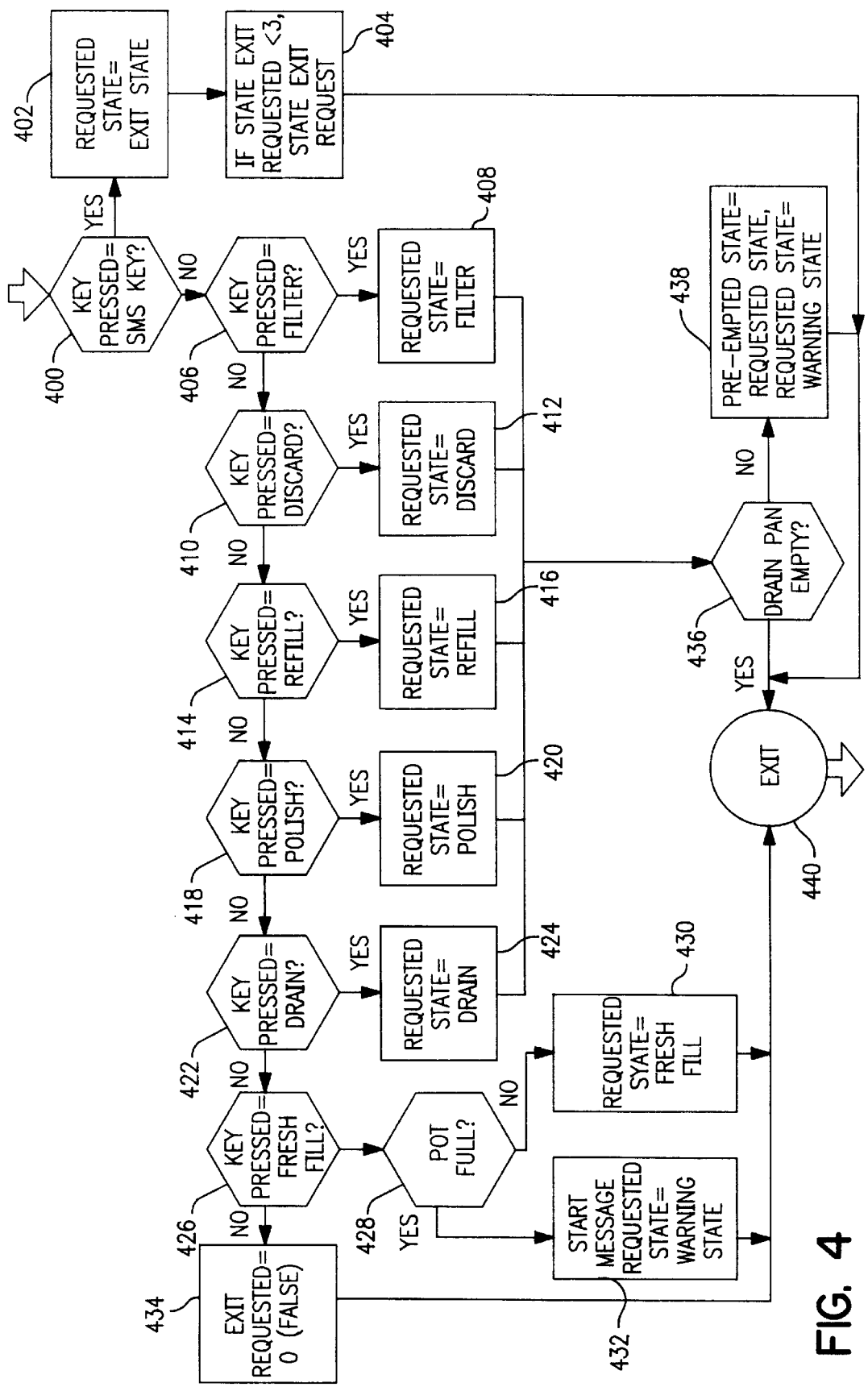
FIG. 4 is a flowchart illustrating a method for the top level state in accordance with the present invention.

Referring to FIG. 4, step 400 acknowledges the initiation of the shortening management system has been entered. For example, the shortening management system is entered by an operator pressing and holding the SMS key 304 for about one second. This represents a manual initiation of the shortening management system. The shortening management system also may be entered if the shortening is not above a level for safe cooking operations. For example, the shortening may be below a level sensor 118 and cooking operations may not commence until the level is brought up by the shortening management system. This determination may occur when the power switch (not shown) for fryer system 100 is switched to the "on" position. It also may be necessary to check cooking medium level prior to any cooking operations being commenced. This safeguard allows the operator an opportunity to fill frypot 104 before heater activation, if needed. The shortening management system also may be accessed after a programmed period of time, so that filtering of the shortening may occur. In this embodiment, the entry into the shortening management system may be forced e.g., the operator may not bypass the shortening management system until the required operations are performed.

In another embodiment, this forced entry may be bypassed, if certain conditions are met. This bypass option may be used at times of peak use of fryer system 100, such as lunchtime, and entering the shortening management system is not feasible. The bypass option may only be used once. A bypass value determines whether the option is available. If the bypass value is false, then the bypass option is available. If the bypass value is true, the bypass option has already been exercised and is not available.

The shortening management system may be entered in a cool mode. A cool mode indicates the shortening has been melted and is ready for cooking operations. The frypot 104 may also require a pot temperature of above 250° F., or 121° C. Finally, there must be enough shortening within frypot 106. For example, if frypot 104 has level sensors at the top fill line and the low fill line, the required level may be between the top fill line sensor and the low fill line sensor. In another embodiment, the shortening management system may be automatically entered upon entering the cool mode.

After the shortening management system is entered, one of the keys shown in FIG. 3 is activated in order to initiate a function. In step 400, it is determined whether the key activated is SMS key 304. If SMS Key 304 is activated, step 402 is executed and indicates that the shortening management system is to be exited. Step 404 determines whether the shortening management system exit request has activated less than three times. If so, fryer system 100 may stay in the shortening management system. Otherwise, it may exit. In step 400, if SMS key 304 is not activated, then the top level state is continued.

Upon entrance into the shortening management system, a top level state is entered, in which the operator is offered a series of operation selection options. These operations may include filtration state, a polish state, a discard state, a fresh fill state, and draining state, or a refill state. These options are shown in the display 306 of key pad 300 by a series of displays with descriptive prefix key numbers to prompt the operator. None of the above options are available, however, if drain pan 106 is out of position. If drain pan 106 is not properly positioned under frypot 104, a message warning that the drain pan is not positioned may be generated. When drain pan 106 is properly positioned, the above options again are available.

In the filter state, shortening is transferred from frypot 104 to drain pan 106 and filtered. The filtered shortening is then transferred back to frypot 104 until frypot 104 is full. In the polish state, there is a filling of frypot 104 followed by an opening of drain valve 108 for a predetermined period, e. g., about five minutes. This opening allows cycling the shortening from frypot 104 to drain pan 106. At the end of the five minute period, drain valve 108 is shut to allow frypot 104 to be refilled. The polish is completed when all the shortening has been returned to the frypot 104. In the fresh filling state, fresh shortening is brought from fresh storage tank 130 into frypot 104. The fresh filling state is completed when frypot 104 is full. In the discarding state, used shortening is pumped from drain pan 106. The discarding state is completed when drain pan 106 is empty. In the draining state, shortening is drained from frypot 104 into drain pan 106. The draining state is completed when frypot 104 is empty. In the refilling state, shortening is transferred from the drain pan 106 into frypot 104. The refilling state is completed when frypot 104 is full.

In step 406, if filter key 308 from FIG. 3 is activated for a predetermined time period, e.g., for about one second, then step 408 is executed. In step 408, fryer system 100 is instructed to initiate the filter state. If filter key 308 has not been activated, fryer system 100 proceeds to step 410 and queries whether discard key 312 has been activated. In step 412, the discard state is entered if discard key 312 was activated in step 410. In step 414, if refill key 318 is activated, then step 446 is executed. In step 446, the refill state is entered. In step 418, if polish key 310 is activated, then step 420 is executed. In step 420, the polish state is entered. In step 422, if the drain key 316 is activated, then step 424 is executed. In step 424, the drain state is entered. After the requested state has been executed and control returned to the top level state, as shown in FIG. 4, step 436 queries if drain pan 106 is empty.

If drain pan 106 is not empty, e.g., shortening is still within drain pan 106 in step 436, then step 438 is executed. In step 438, the requested state becomes a pre-empted state. The pre-empted state is the state that has been put on hold while a warning state is entered. The warning state alerts the operator that an operation is about to occur that may result in damage to equipment. The shortening management system will stay in the warning state until the condition has been eliminated. Once the condition has been resolved, the warning state may be exited and the pre-empted state may be reinitiated.

In step 426, if fresh fill key 314 is activated, then, in step 428, a query is made whether frypot 104 is fill. If frypot 104 is full, step 432 is executed. In step 432, the warning state is entered and a message is initiated to warn the operator of the danger of overfilling frypot 104 if already full. If frypot 104 is not full in step 428, then step 430 is executed and the fresh fill state is entered.

If no key is activated in the top level state, step 434 indicates that an exit request has not been activated and is equal to zero, and the system is not to be exited at this time. If the drain pan is empty in step 436, step 440 is executed. In step 440, a variety of operations may be performed. Controller 102 may leave the top level state to perform other functions not related to the shortening management system, such as displaying information, making measurements, and incrementing system clocks. In step 440, controller 102 may also return to the top of the top level state flow chart and re-execute step 400. Step 400 may be re-executed until the time that the operator desires to exit the shortening management system by activating SMS key 304 and exiting, as shown in step 404.

Figure 5:
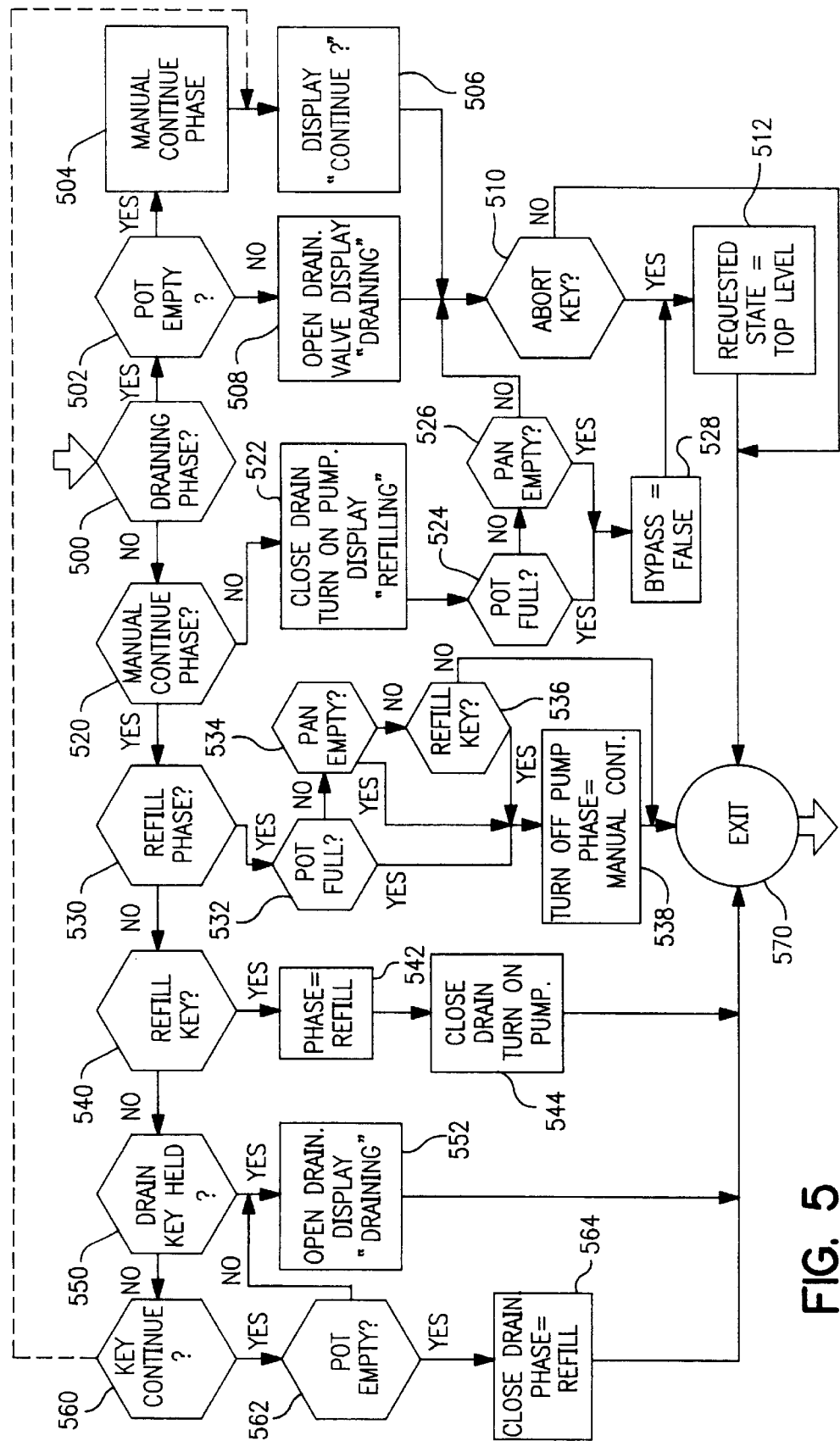
FIG. 5 is a flowchart illustrating a method for the filter state in accordance with the present invention.
Figure 8:
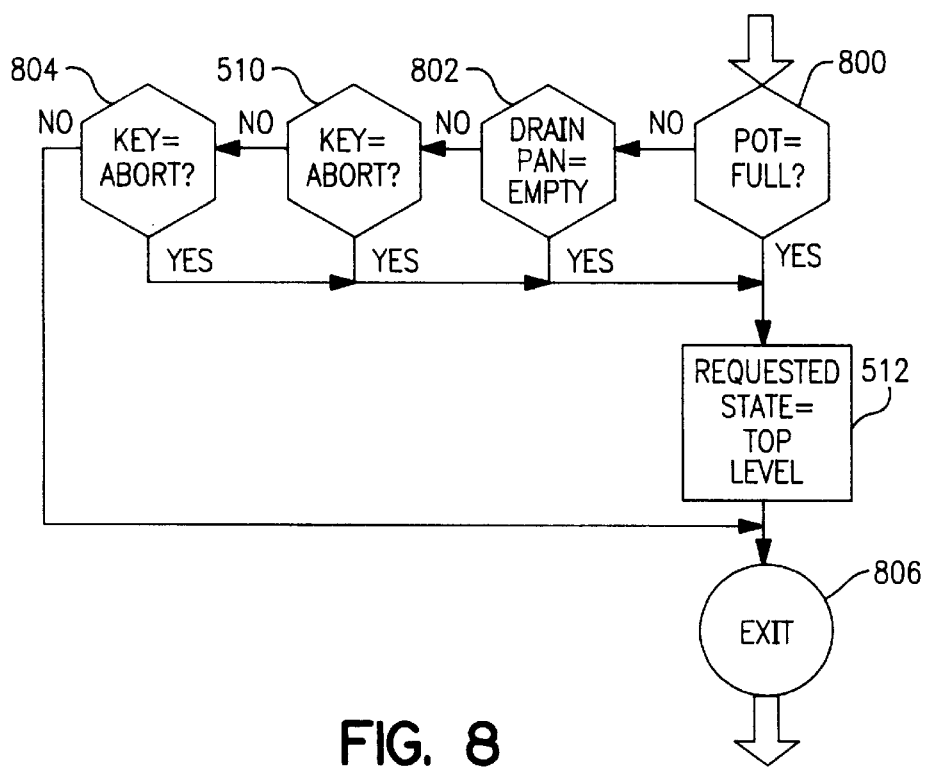
FIG. 8 is a flowchart illustrating a method for the refill state in accordance with the present invention.

If filter key 308 is activated for approximately one second in step 406, then step 408 is executed and the filter state entered by receiving a filter signal from controller 102. Referring to FIG. 5, the filter state is disclosed. Keypad 300 may display "FILTER" in display 308. The filter state may be separated into three phases, as disclosed in FIG. 5. These phases are a draining phase, a manual continue phase, and a refill phase. The draining phase is performed to drain shortening from frypot 104 to drain pan 106. The draining phase may also be initiated in the top level state as the draining state. The manual continue phase is performed when a task has been completed to query the operator for an input to continue with the filter state. The refill phase is performed to move the filtered shortening back to frypot 104 from drain pan 106. The refill phase may also be initiated in the top level state as the refill state, as shown in FIG. 8. In step 500, the initial inquiry upon entering the filter state is whether the state is in a draining phase. If the state is in a draining phase, then, in step 502, the query is made whether frypot 104 is empty. Step 504 is executed if frypot 104 is empty and places the system in the manual continue phase. This manual continual phase is provided to allow for asynchronous activities such as cleaning, training and refilling as desired by the operator. The manual continue phase shown in step 504 may also serve to notify an operator that another step may be taken.

In step 506, "CONTINUE" may be displayed on keypad 300 to notify the operator that the system is in the manual continue phase. The operator then may activate continue key 320 to execute the next step. If frypot 104 is not empty in step 502, then, in step 508, drain valve 108 is opened and "DRAINING" is displayed on keypad 300 to the operator. The shortening is then transferred from frypot 104 to drain pan 106. The shortening is drained in the draining phase in order to be filtered. A draining signal is received from controller 102. The draining state is completed when frypot 104 is empty. Also, in another embodiment, incremental draining may be allowed when the operator holds drain key 316 to close drain valve 108. The draining state in step 424 shown in FIG. 4 is equivalent to this draining phase when entered from the top level state.

In step 510, an abort key 322 may be activated to abort the current operation. If at any time, abort key 322 is activated, the current operation is aborted. The controlled valves, motors and pumps assume a "safe" position. This "safe" position indicates that no shortening may be moved between different segments of fryer system 100. If abort key 322 is activated in step 510, then the requested state becomes the top level state, and controller 102 returns to the top level state shown in FIG. 4.

If the system in not in the drain phase in step 500, then step 520 is executed. Step 520 inquires whether the system is in a manual continue phase. If the system is not in manual continue phase in step 520, then step 522 is executed by closing the drain and turning on the pump. In addition, "REFILLING" may be displayed on keypad 300 to the operator. In step 524, it is determined whether frypot 104 is full. A full frypot in step 524 prompts the execution of step 528, which then makes the bypass equal to false. If the pot is not full, then, in step 526, it is determined whether drain pan 106 is empty. If drain pan 106 is empty in step 526, then step 528 is executed by making the bypass equal to false. By setting the bypass equal to false, the operator may bypass a forced shortening management system entry one time, as disclosed in step 400. A false bypass value indicates a filtering Operation has been performed. If the pan is not empty in step 526, then abort key 322 query is executed in step 510. After the execution of step 528, when frypot 104 is full in step 524 or drain pan 106 is empty in step 526, the requested stated in step 512 becomes top level state, and controller 102 returns to top level state shown in FIG. 4. Thus, the filtered shortening has been returned to frypot 104. In another embodiment, all these operations may be automated by eliminating the manual continue phase, and operator intervention is not required.

If it is determined in step 520 that the system is in manual continue phase, then step 530 queries whether the system is in the refill phase. If the system is in the refill phase in step 530, then step 532 queries whether frypot 104 is full. If frypot 104 is full in step 532, then, in step 538, the pump is turned off and the phase returns to manual continue phase. If the frypot 104 is not full in step 532, then step 534 queries whether drain pan 106 is empty. If drain pan 106 is empty, then step 538, as disclosed above, is executed, and the phase becomes the manual continue phase. If drain pan 106 is not empty in step 534, then step 536 queries whether refill key 318 has been activated. If refill key 318 has been activated in step 536, then step 538 is executed and returns to manual continue phase. If refill key 318 has not been activated in step 536, then step 538 is bypassed. Once the refill phase has been completed and step 530 results in a negative query, then step 540 queries whether refill key 318 has been activated. If refill 318 key has been activated in step 540, then step 542 is executed by setting the phase to equal the refill phase. Once the refill phase is entered, step 544 is executed and the drain is closed and the pump turned on.

If the system is not in the refill phase in step 530 and refill key 318 has not been activated in step 540, then step 556 is executed by querying whether drain key 316 has been activated. If drain key 316 has been activated, step 552 is executed by opening the drain and displaying "DRAINING" to the operator on keypad 300. Controller 102 sends a draining signal and places system in the draining state. If drain key 316 has not been activated in step 550, then step 560 queries whether continue key 320 has been activated. If continue key 320 was activated in step 560, step 562 queries whether the frypot 104 is empty. If frypot 104 is determined to be full in step 562, step 564 causes drain valve 114 to close and places the system phase equal to refill phase by controller 102 sending a refill signal. If frypot 104 is not empty in step 562, then step 552 is executed as disclosed above by opening the drain and displaying "DRAINING" to an operator.

Step 570 allows controller 102 to perform other functions outside the filter state. The shortening management system, however, remains in the filter state by returning to step 500 to determine whether the phase has been completed by using the methods disclosed in FIG. 5. Once filtration has been completed, controller 102 returns to top level state, as shown in step 512.

Figure 6:
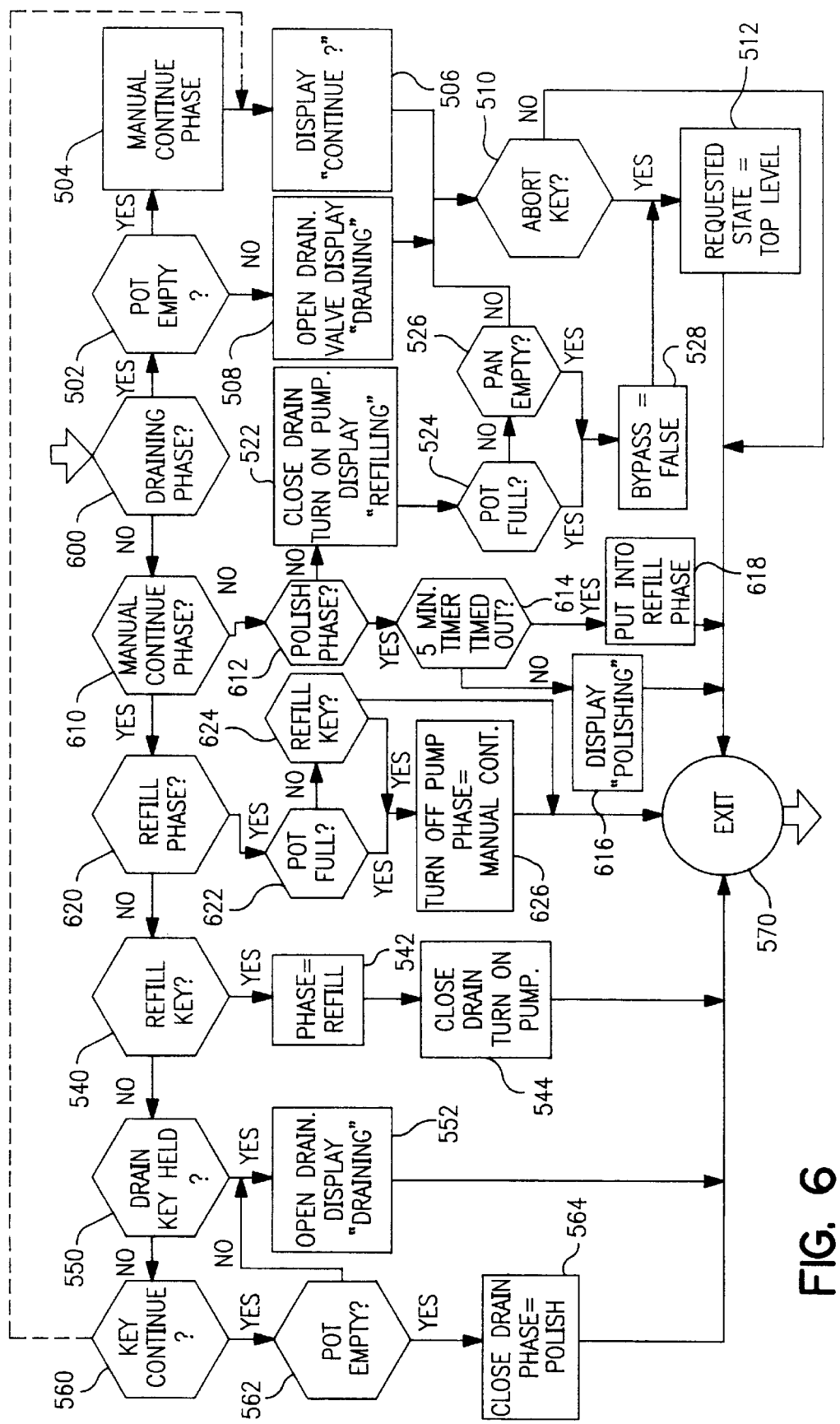
FIG. 6 is a flowchart illustrating a method for the polish state in accordance with the present invention.

If polish key 310 is activated in step 418 of FIG. 4, then the method disclosed in FIG. 6 is executed, and fryer system 100 is placed in the polish state. Controller 102 sends a polish signal that notifies fryer system 100 to enter the polish state. The polish state is typically entered after a period of non-use by fryer system 100. In step 600, an initial query of whether fryer system 100 is in the draining phase is made. If fryer system 100 is in the draining phase, steps 502, 504, 506, 508, 510, and 512 are executed as disclosed in the discussion accompanying FIG. 5.

If fryer system 100 is not in the draining phase in step 600, then step 610 is executed. Step 610 queries whether fryer system 100 is in the manual continue phase. This phase is similar to the manual continue phase disclosed in reference to FIG. 5, where the operator is prompted to proceed to the next step in the polish state.

If fryer system 100 is not in the manual continue phase, then step 612 queries whether the system is in the polish phase of the polished state. When the system is in the polish phase, then step 614 is executed and determines whether a predetermined polish time period has elapsed in order to allow the polishing to occur. In one embodiment, this time period is about five minutes. Other embodiments, however, may require different polishing times and the system may be programmed to execute these times. While in the polish phase, a filling of frypot 104 with shortening is executed followed by an opening of drain valve 114 in order to provide a means of cycling the shortening from frypot 102 to drain pan 106. The level needed to polish may be determined by system requirements, or operator input. This cycling may be for a predetermined period of about five minutes, as indicated in steps 614.

For example, the polish state may be performed after fryer system 100 has been dormant. Usually, this situation occurs at the time of the first usage for a given day. Shortening may be placed in fryer system 100 and melted into a liquid state by going through a melt mode. In this melt mode, the shortening is pulse heated to about 185° F., or 85° C. After the melt mode is finished, the fryer system 100 then enters a cool mode where the shortening is heated to a temperature of about 250° F., or 121° C. This cool, or idle, mode is maintained to assure the integrity of the shortening for cooking operations. After entering this cool mode, fryer system 100 may then initiate the polish mode through the shortening management system.

The shortening used in the polish phase for polishing may be used or fresh shortening. Used shortening may be located in the drain pan 106 and circulated to frypot 104. In another embodiment, the shortening may be fresh shortening brought from fresh storage tank 130.

If, in step 612, system 100 is not in the polish phase, step 522 is executed, and drain valve 108 is closed, the pump turned on, and "REFILLING" is displayed to the operator on keypad 300. Steps 524, 526 and 528 are executed, as discussed above with respect to FIG. 5. In step 616, "POLISHING" is displayed while the polishing phase is being executed. After the polishing phase has been completed and the passage of about a period of about five minutes has been determined in step 614, step 618 places the system into the refill phase.

If the manual continue phase has been entered in step 610, then 620 queries whether the refill phase has been entered. If the refill phase has been entered in step 620, then step 622 queries whether frypot 104 is full. A full frypot in step 622 results in execution of step 626, which turns off the pump and the places fryer system 100 back into the manual continue phase to await further instructions from the operator. If frypot 104 is not full in step 622, step 624 queries whether refill key 318 has been activated. If refill key 318 has been activated in step 626, step 626 is executed as disclosed above. If refill key 318 has not been activated in step 624, step 626 is bypassed.

Steps 540, 542, 544, 550, 552, 560, 562 and 564 are also executed in the polish state as discussed with respect to FIG. 5 for the filter state. These steps may cause fryer system 100 to enter refill or drain phases, as indicated. The discussion concerning these steps in the filter state is applicable for these same steps in the polish state.

Figure 7:
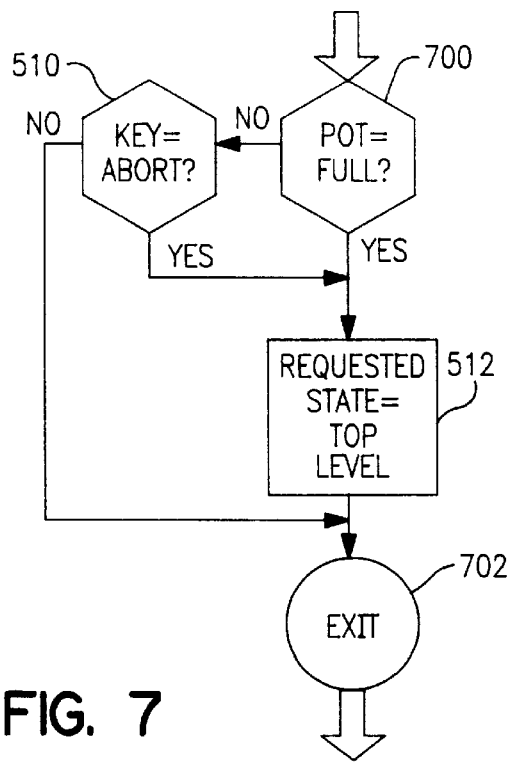
FIG. 7 is a flowchart illustrating a method for the fresh fill state in accordance with the present invention.

Referring to FIG. 7, a method to show the fresh fill state is disclosed. The fresh fill state is entered when fryer system 100. In step 700, a query is made whether frypot 104 is full. If frypot 104 is full in step 700, then step 512 returns the system back to the top level state. If frypot 104 is not full in step 700, step 510 queries whether abort key 322 has been activated to abort operations. If abort key 322 has been activated in step 510, then step 512 returns controller 102 to the top level state and executes the abort functions, as discussed above. Otherwise, in step 702, controller 102 may exit to perform other operations, while keeping the shortening management system in the fresh fill state. The fresh fill state provides a means for the operator to request fresh shortening to be drawn into frypot 104, either to totally fill or to replenish a used quantity. The fresh shortening may be drawn from fresh storage tank 130, as discussed with respect to FIG. 1. The valves and pumps are positioned for the fresh filled state operations. The fryer pump motor is activated and fresh shortening is drawn into frypot 104 until the upper pot level condition is met. When the pot is deemed full in step 700, controller 102 exits the fresh filled state.

Referring to FIG. 8, a method for executing the refill state is described. The refill state is entered by activating refill key 318 in step 414, and a refill signal is sent from controller 102 to the system. The refill state is also equivalent to the refill phase in the filter and polish states discussed in FIGS. 5 and 6, respectively. In step 800, the system queries whether the frypot 104 is full. If frypot 104 is full, then step 512 is executed by returning back to the top level state. If frypot 104 is not full in step 800, step 802 queries whether drain pain 106 is empty. The refill states transfers shortening from drain pan 106 to frypot 104. Thus, if drain pan 106 is empty in step 802, step 512 is executed and the system returns to the top level state. If drain pan 106 is not empty in step 802, an abort query is executed in step 510, as disclosed above. If abort key 322 has not been activated in step 510, then step 804 is executed by querying whether refill key 318 has been activated. Step 806 indicates that controller 102 may leave the shortening management system to perform other commands while returning to perform the refill state until completion. Thus, refilling will continue until either frypot 104 is full or drain pan 106 is empty. The refill state provides a means for the operator to transfer some or all of the shortening of drain pan 106 back into frypot 104.

Figure 9:
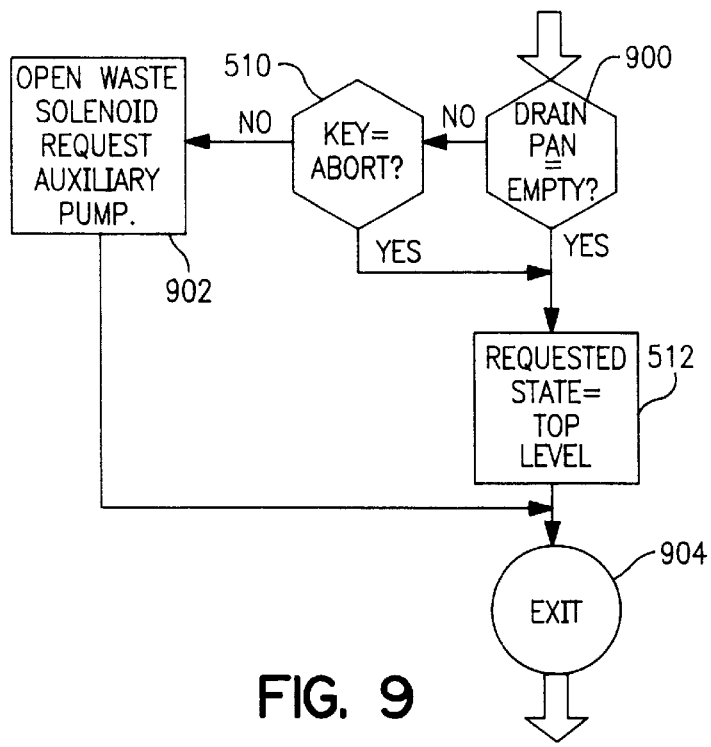
FIG. 9 is a flowchart illustrating a method for the discard state in accordance with the present invention.

Referring to FIG. 9, a method to perform the discard state is shown. Upon activating discard key 312 in step 410, the discard state is entered and a discard signal sent from controller 102. The discard state provides a means to drain the drain pan 106 of some or all of its used shortening. In step 900, the system is queried whether drain pan 106 is empty. If drain pan 106 is empty in step 900, step 512 is executed to return to controller 102 back to the top level state shown in FIG. 4. An empty drain pan 106 indicates the shortening has been removed. If drain pan 106 is not empty in step 900, step 510 queries whether abort key 322 has been activated, as disclosed above. If abort key 322 has been activated in step 510, then step 512 is executed, as disclosed above. If drain pan 106 is not empty and abort key 322 has not been activated, then step 902 is executed by opening the waste solenoid and requesting the auxiliary pump to be turned on. Thus, if drain pan 106 is not empty, controller 102 will remain in the discard state. The shortening management system may allow for incremental draining for cleaning and other purposes by requiring further inputs from the operator.

Figure 10:
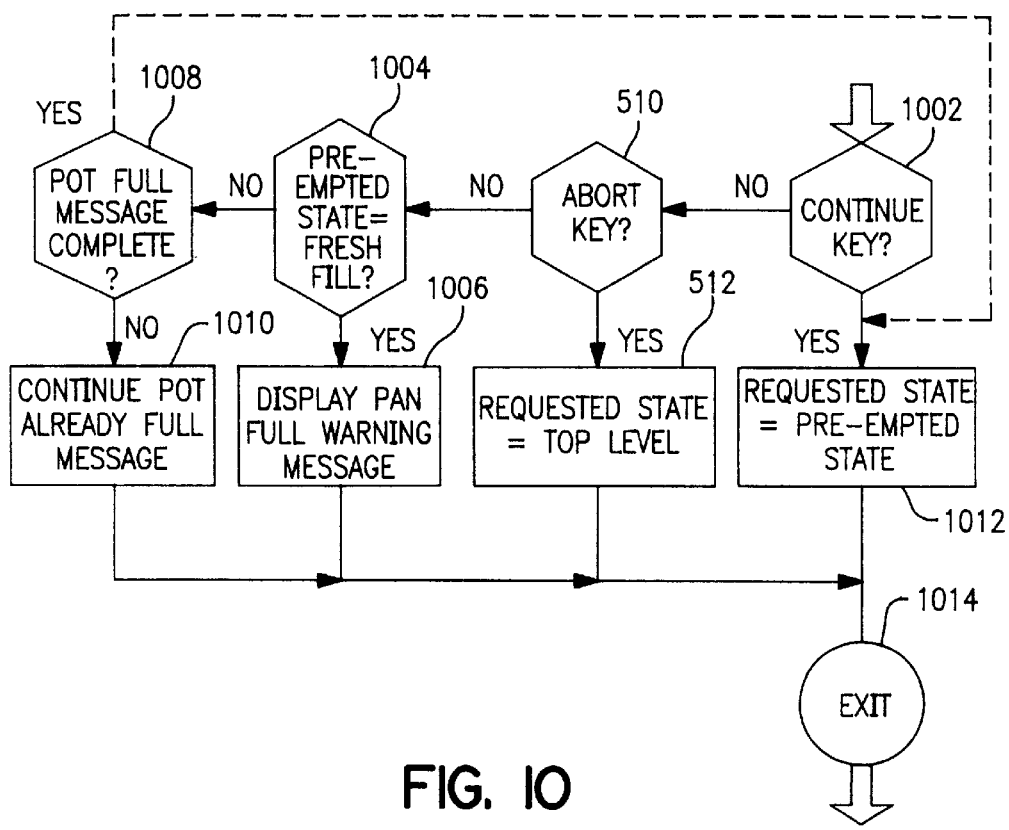
FIG. 10 is a flowchart illustrating a method for the warning state in accordance with the present invention.

Referring to FIG. 10, a method for performing warning state is described. The warning state may be entered in steps 432 and 438 of FIG. 4, and a warning signal has been sent by controller 102. The fryer system 100 will stay in the warning state until the condition that caused the warning is eliminated. Once the condition has been eliminated, in Step 1002, continue key 320 may be activated to exit the warning state. If continue key 320 has been activated, step 1012 is executed by placing the requested state of the system to be equal to the state that was preempted by the warning state.

For example, if the pre-empted state was the filter state prior to the warning state being executed, then the operator may activate continue key 320 to return back to the filter state. If abort key 320 has been activated in step 510, then step 512 is executed by returning 102 back to the top level state. In step 1004, the system is queried whether the pre-empted state prior to entering the warning state was the fresh fill state. If the pre-empted state is the fresh fill state, step 1006 is executed by displaying "PAN FULL" warning message to the operator. If the pre-empted state is not fresh fill state, then state 1008 is executed. In step 1008, the system is queried as to whether a "POT ALREADY FULL" message has been completed to warn of the condition of frypot 104 in step 432, discussed in FIG. 4. In step 1010, the procedure to display the "POT ALREADY FULL" message is continued if the pot full message step 1008 has not been completed. In 1008, if the pot full message has been completed, then step 1012 is executed as disclosed above. Step 1012 may be reached by operator intervention and activating continue key 320. In step 1014, the shortening management system may be exited to allow controller 102 to perform other operations as required. Also, step 1014 returns the warning state back to step 1002.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification and examples be considered as exemplary only, with the true scope and spirit of the invention being indicated by the following claims.

We claim:

1. A cooking medium management system for manipulating a cooking medium during cooking operations, comprising:

a controller generating a lockout signal and a transfer signal and selectively generating at least one control signal selected from the group consisting of a discard signal, a fresh fill signal, a filtration signal, a polish signal, and combinations thereof;

a cooking medium transfer pump and a transfer conduit for transferring said cooking medium to and from at least one frypot and to and from at least one drain pan, wherein said transfer pump activates in response to said transfer signal;

a lockout device, which receives said lockout signal and disables at least one fryer heater;

a discard device, which receives said discard signal and includes said at least one frypot, said at least one drain pan, a drain valve and a cooking medium drain, wherein said at least one frypot and said at least one drain pan are placed in communication with said transfer conduit via said drain valve, and, subsequently, said at least one drain pan and said cooking medium drain are placed in communication with said transfer conduit in response to said discard signal;

a fresh fill device, which receives said fresh fill signal and includes said at least one frypot and a cooking medium source, wherein said at least one frypot and said cooking medium source are placed in communication with said transfer conduit in response to said fresh fill signal;

a filtration device, which receives said filtration signal and includes said at least one drain pan, wherein said drain pan is placed in communication with said transfer conduit in response to said filtration signal; and a polish device, which receives said polish signal and places said at least one frypot and said at least one drain pan in communication with said transfer conduit in response to said polish signal, fills said at least one frypot is to a predetermined level, and places said at least one frypot and said at least one drain pan in communication with said transfer conduit for a predetermined time period, and said at least one drain pan out of communication with said transfer conduit after completion of said predetermined time period.

2. The system of claim 1, wherein said transfer signal is a drain signal.

3. The system of claim 1, wherein said transfer signal is a refill signal.

4. The system of claim 1, wherein said cooking medium is selected from the group consisting of shortening, lard, vegetable oil, canola oil, butter, margarine, peanut oil and water and with combinations thereof.

5. The system of claim 1, wherein said at least one frypot includes a cooking medium temperature sensing device generating a temperature value.

6. The system of claim 1, wherein said at least one frypot includes a cooking medium level sensing device generating a level value.

7. The system of claim 1, wherein said cooking medium drain further comprises a waste tank.

8. The system of claim 7, wherein said waste tank is placed in communication with said transfer conduit in response to said discard signal.

9. The system of claim 1, wherein said cooking medium source further comprises a storage tank and said storage tank is placed in communication with said transfer conduit in response to said fresh fill signal.

10. The system of claim 1, wherein said cooking medium source further comprises a storage tank and wherein said storage tank is placed in communication with said transfer conduit in response to said polish signal.

11. The system of claim 1, further comprising a warning signal generated when an error occurs in said cooking management system, wherein said transfer signal and said at least one control signal is pre-empted in response to said warning signal.

12. The system of claim 11, wherein said cooking medium transfer pump and said transfer conduit are deactivated in response to said warning signal.

13. The system of claim 11, wherein said drain valve is closed in response to said warning signal.

14. The system of claim 1, further comprising a continue signal, wherein said at least one control signal is reselected in response to said continue signal.

15. The system of claim 1, further comprising an abort signal, wherein said controller generates another said lockout signal and said transfer signal in response to said abort signal.

16. The system of claim 1, said drain pan comprising at least one filter tank placed in communication with said transfer conduit in response to said filtration signal and wherein each of said at least one filter tank includes a filter screen for removing particles and foreign matter from said cooking medium and wherein said filter screen is removable from each of said at least one filter tank.

17. The system of claim 1, further comprising a keypad, wherein said keypad interfaces with said controller.

18. The system of claim 17, wherein said keypad receives manual input from an operator.

19. The system of claim 18, wherein said keypad displays information about said at least one control signal to said operator.

20. The system of claim 1, wherein said filtration device further comprises a drain pan transfer pump, said drain pan transfer pump is activated and is placed in communication with said at least one frypot and said drain pan in response to said filtration signal.

21. The system of claim 1, wherein said lockout signal, said transfer signal and said at least one control signal are generated at intervals by said controller.

22. The system of claim 21, wherein said controller is programmed with said intervals.

23. The system of claim 1, wherein said drain valve is electrically operated in response to said controller.

24. The system of claim 23, wherein said drain valve is selected from the group consisting of a globe-type valve and a ball-type valve.

25. The system in claim 1, wherein said transfer conduit is adapted for removal from said devices.

26. The system of claim 1, wherein said transfer conduit includes a manual drain and at least one check valve.

27. The system of claim 1, wherein said at least one drain pan is positioned below said at least one frypot and said transfer conduit.

28. The system of claim 11, wherein said warning signal is generated in response to said fresh fill signal when said at least one frypot is full.

29. The system of claim 28, further comprising a warning device, which receives said warning signal and pre-empts said at least one control signal.

* * * * *